United States Patent [19]
Painter et al.

[11] Patent Number: 5,428,118
[45] Date of Patent: Jun. 27, 1995

[54] GAS PHASE FLUIDIZED BED POLYOLEFIN POLYMERIZATION PROCESS USING GAS OR GAS-SOLIDS TANGENTIAL FLOW

[75] Inventors: Roger B. Painter, Scott Depot; Billy J. Garner, Charleston, both of W. Va.; Gyung-Ho Song, Seoul, Rep. of Korea

[73] Assignee: Union Carbide Chemicals & Plastics Technology Corporation, Danbury, Conn.

[21] Appl. No.: 276,086

[22] Filed: Jul. 15, 1994

[51] Int. Cl.⁶ .................................. C08F 2/34
[52] U.S. Cl. ........................... 526/74; 526/65; 526/88; 526/901
[58] Field of Search ............ 526/74, 88, 901, 65

[56] References Cited

U.S. PATENT DOCUMENTS 4,518,750  5/1985  Govoni et al. .................... 526/88

FOREIGN PATENT DOCUMENTS

0486200A1   5/1992  European Pat. Off. .
0579426A1   1/1994  European Pat. Off. .
51-151263A 12/1976  Japan .

Primary Examiner—Joseph L. Schofer
Assistant Examiner—Tom Weber
Attorney, Agent, or Firm—B. L. Deppenbrock

[57] ABSTRACT

An improved method for polymerizing one or more polyolefins in the presence of a transition metal catalyst in at least one gas phase reactor having an expanded section, the improvement comprising generating a tangential flow of gas or gas-solids in the expanded section of the gas phase reactor to reduce fines entrainment into the gas cycle system and to reduce or remove solid particle build-up on one or more interior surfaces of the expanded section of the reactor.

11 Claims, 2 Drawing Sheets

GAS PHASE FLUIDIZED BED POLYOLEFIN POLYMERIZATION PROCESS USING GAS OR GAS-SOLIDS TANGENTIAL FLOW

FIELD OF THE INVENTION

This invention relates to an improved gas phase fluidized bed polyolefin polymerization process. More particularly, the present invention is directed to the use of a tangential flow of gas or gas-solids to improve polyolefin polymerization of one or more alpha-olefins.

BACKGROUND OF THE INVENTION

The introduction of high activity Ziegler-Natta catalyst systems has led to the development of new polymerization processes based on gas phase reactors as disclosed in U.S. Pat. No. 4,482,687, issued Nov. 13, 1984. These processes offer many advantages over bulk monomer slurry processes or solvent processes. They are more economical and inherently safer in that they eliminate the need to handle and recover large quantities of solvent while advantageously providing low pressure process operation.

The versatility of the gas phase fluid bed reactor has contributed to its rapid acceptance. Alpha-olefin polymers produced in this type of reactor cover a wide range of density, molecular weight distribution and melt indexes. In fact, new and better products have been synthesized using single- and multiple-, or staged-, gas phase reactor systems because of the flexibility and adaptability of the gas phase reactor to a large spectrum of operating conditions.

Conventional gas phase fluidized bed reactors used in polymerizing alpha-olefins have a cylindrical shaped fluidized bed portion and an enlarged, tapered-conical entrainment disengaging section, sometimes referred to as the expanded section. Solid particulates are projected upward into the expanded section through the bursting of rising gas bubbles at the surface of the fluidized bed, and most of these particulates are typically returned to the fluidized bed by gravity as their velocity dissipates in the lower gas velocities of the expanded section. A small quantity of fine powder, or fines, is elutriated out of the projected particulates and does not return directly to the fluid bed by gravity. These fines are either conveyed upward by the cycle gas to the reactor gas outlet, or settle on surfaces of the expanded section through gravity or through particle attraction forces such as electrostatic attraction.

Disengaged fines that settle on the expanded section surfaces are known to accumulate as layers of fines under certain conditions. Settled fines are generally reactive and continue to polymerize in place at a rate related to the concentration of active catalyst contained in the fines. Such layers typically build to sufficient thicknesses in a short period of time that the forces holding them in place are overcome by gravity and the layers then slide harmlessly back into the fluid bed. Larger particulates from the fluid bed may also be projected onto the layers of fines, especially at lower elevations near the bed surface, causing all or part of the layer to be released and to then re-enter the bed through gravity. The cycle of fines buildup and return to the bed occurs repetitively in normal operation.

Under certain conditions, depending on factors such as electrostatic forces on the particles, the time cycle for return of the fines layers to the fluid bed becomes longer than normal. Longer cycle times are highly undesirable, since continued polymerization within the settled fines continues at temperatures higher or lower than the controlled bed temperature. Stagnant layers of fines are self-insulating, and, therefore, heat accumulation from continued polymerization within the layer can lead to temperatures above the sintering or melting point resulting in formation of molten sheets of resin, known as sheeting. Sheeting is the formation and adherence of fused catalyst and resin particles on the walls of a reactor, particularly in the expanded section. When the sheets are disturbed or become heavy, they can fall off the walls and plug the product discharge system or clog the distributor plate. Sheets and retained fines from the expanded section also contribute to product quality problems by increasing the level of non-specification contamination such as high molecular weight gels in end-use products such as plastic containers and films. Sheeting and fines accumulations are collectively referred to as solid particle build-up.

Conversely, expanded section fines layers that are relatively inactive are cooled by the reactor wall to temperatures below reactor temperature, resulting in much higher molecular weights and other product properties that are different from the average of the fluidized bed. These fines increase the level of non-specification contamination in end-use products, causing undesirable irregularities such as high molecular weight gels, and may be sufficient to cause downgrading of the resin product to lower quality grades of significantly reduced value.

The enlarged entrainment disengaging section is employed to minimize the quantity of fine powder, or fines, entrained by the cycle gas into the gas cycle system. Fines exiting the reactor with the cycle gas are generally conveyed through the gas cycle system before re-entering the fluidized bed at the bottom, but a smaller portion of fines adheres to surfaces of the gas cycle system. Such fines promote undesirable polymer growth and fouling of surfaces in the cycle piping, cycle cooler, compressor, lower reactor head, and distributor plate resulting in undesirable reactor shutdowns for system cleaning. Adhered particles in the cycle system continue to polymerize over time under process conditions different from the fluid bed, forming polymer of significantly different properties, such as molecular weight, density, and molecular weight distribution, from that of the fluid bed. Some particles are eventually released from the cycle system surfaces and are conveyed by the cycle gas back into the fluid bed. Such particles contaminate and adversely affect properties of the polymer product, such as by increasing the gel level in end-use products such as plastic containers and films.

Conventionally, to prevent solid particle build-up from affecting these and other parts of the reactor system, as well as the final polymer product, the reactors are shutdown periodically and the walls are cleaned to remove particle buildup. When a reactor is down for cleaning, it is typically hydro-blasted, sand-blasted, or shell-blasted using high pressure jets to remove sheets and fines build-up. Since water and oxygen introduced during the blasting process are strong catalyst poisons, the reactor must be purged to remove these poisons and the reactor must be dried. This process is both time consuming and costly. As a result, significant savings can be obtained with the prevention of a single shutdown.

It is also conventional practice to maintain the level of the fluidized bed a few feet below the neck of the expanded section to avoid the accumulation of fines in the expanded section. Thus, the volume of the fluidized bed, and, therefore, the amount of polymer in the reactor is conventionally controlled at a fixed level to avoid the undesirable effects of solid particle build-up in the expanded section.

Measures allowing the fluidized bed volume to be temporarily reduced without solid particle build-up are highly desirable, since the amount of lower value off-grade product generated during reactor start-up and grade changes may be reduced. Typical grade transitions require one to three bed turnovers depending on the specific product grades. By temporarily lowering the fluidized bed volume during reactor start-up and grade changes, the quantity of polymer embodied in a given number of bed turnovers may be substantially reduced in direct proportion to the reduction of bed volume.

Lowering the fluidized bed level and at the same time maintaining a constant high production rate will increase the bed volume turnover rate and directly reduce the polymer residence time. During the operation of the gas phase fluidized bed polymerization reactor system, there are times when it is highly desirable to adjust the powder inventory and/or solids residence time. Catalyst productivity and polymerization rate are affected by the residence time of the resin and catalyst in the reactor. Control of catalyst productivity and polymerization rate by adjusting residence time is a desirable method for controlling reactors that are operated in sequence (i.e., staged reactors) to produce products such as bimodal polymers or copolymers. In these types of polymerization processes, control of the proportion of polymer made in each reactor plays a key role in determining the properties and consistency of the final product. Thus, the freedom to apply such measures to temporarily reduce the reactor bed volume without risk of solid particle build-up is desirable and commercially important for the production of certain products, such as bimodal polymers or copolymers produced in staged reactors operated in sequence.

It would be most desirable to improve reactor operation and product quality by reducing sheeting and the accumulation of fines in the reactor expanded section and gas cycle system.

Figure 1:
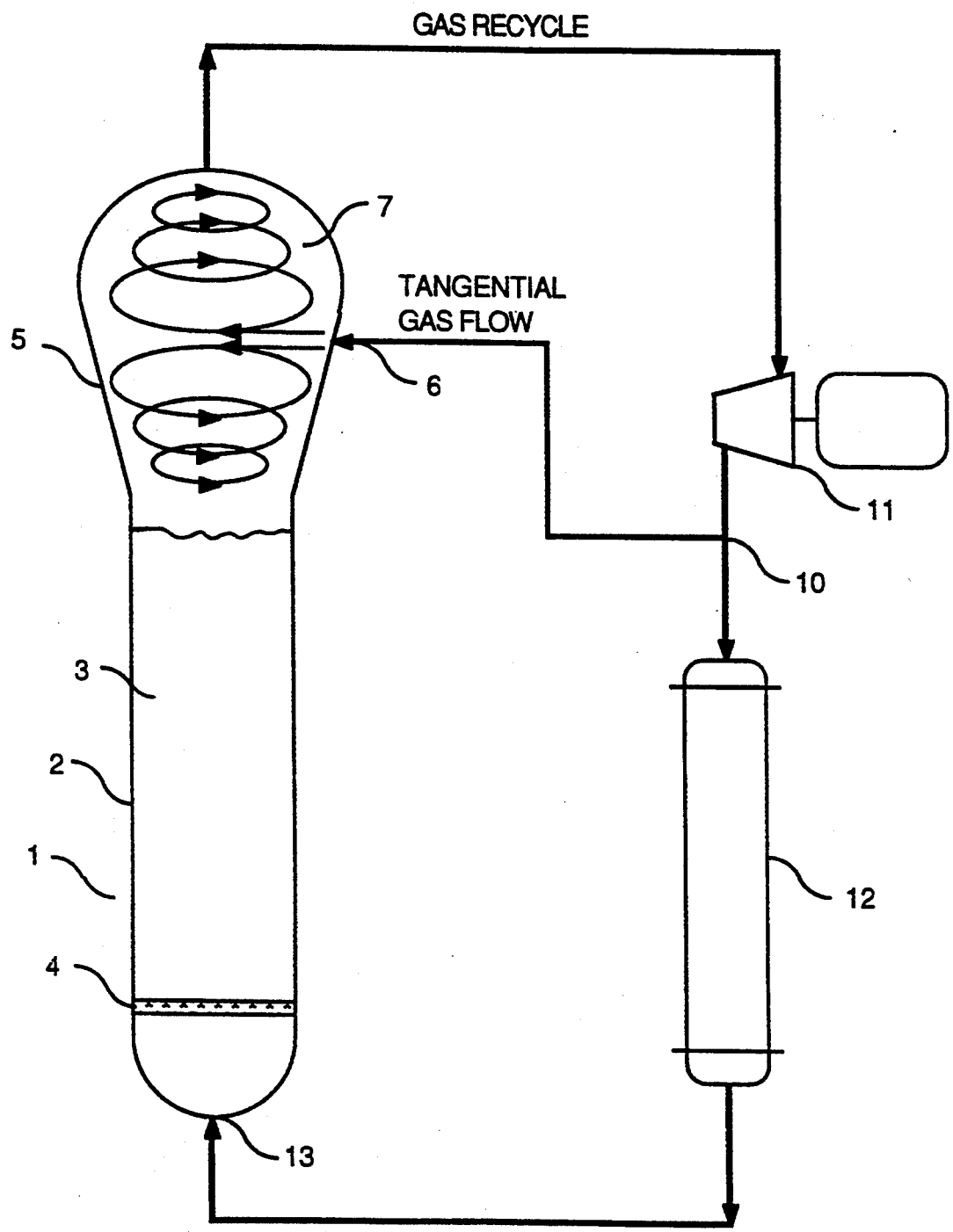
FIG. 1 is a schematic depiction of a tangential gas flow system.

In these Figures, 1 represents a fluidized bed reactor; 2 is a fluidized bed reactor straight section; 3 is a fluidized bed of polymer particles; 4 is a distributor plate; 5 is a fluidized bed expanded section; 6 is an inlet (e.g., one or more tangential nozzles) for gas or gas-solids flow; 7 is a representation of the tangential flow in the reactor generated by the nozzle(s); 8 is a solids feeding device such as a solid-eductor; 9 is an outlet for solids removal; 10 is an outlet for gas removal; 11 is a cycle gas compressor; 12 is a heat exchanger; and 13 is an inlet for cycle gas (primary flow) to the reactor.

SUMMARY OF THE INVENTION

Accordingly, the present invention provides an improved method for polymerizing one or more polyolefins in the presence of a transition metal catalyst in at least one gas phase reactor having a straight section and an expanded section, the improvement comprises generating a flow of gas or gas-solids tangentially to one or more interior surfaces in the expanded section of the reactor to reduce particle build-up.

DETAILED DESCRIPTION OF THE INVENTION

Polymers

Polymers whose gas phase fluidization polymerization process can be benefited by the present invention include polyolefins or alpha olefins such as, for example, linear homopolymers of ethylene, linear copolymers of a major mole percent of ethylene or propylene as the main monomers, and a minor mole percent of one or more $C_3$ to $C_8$ alpha olefins, and so-called "sticky polymers", as well as polyvinyl chlorides and elastomers such as polybutadiene. Preferably, the $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1, heptene-1 and octene-1. This description is not intended to exclude the use of this invention with alpha olefin homopolymer and copolymer resins in which ethylene is not a monomer. Examples of sticky polymers whose polymerization process can be benefited by the present invention include ethylene/propylene rubbers and ethylene/propylene/diene rubbers, polybutadiene rubbers, high ethylene content propylene/ethylene block copolymers, poly(1-butene) (when produced under certain reaction conditions), very low density (low modulus) polyethylenes, i.e., ethylene butene rubbers or hexene containing terpolymers, ethylene/propylene/ethylidenenorbornene and ethylene/propylene hexadiene terpolymers of low density.

Polymerization Process

In general, a polymerization process is conducted by contacting a stream of one or more alpha-olefins in a fluidized bed reactor or a stirred reactor substantially in the absence of catalyst poisons such as moisture, oxygen, carbon monoxide, carbon dioxide and acetylene, with a catalytically effective amount of catalyst at a temperature and a pressure sufficient to initiate the polymerization reaction. These polymerization processes are well known and described, for example, in U.S. Pat. Nos. 4,482,687; 4,558,790; 4,994,534; 5,162,463; 5,137,994; 5,187,246; and 5,194,526. It is extremely critical that the poisons be essentially eliminated since only minor amounts (i.e., $\leq 2$ ppm of carbon monoxide in the cycle gas) have been found to dramatically, adversely affect the polymerization.

A typical polymerization system includes at least one polymerization reactor, a gas cycle system, one or more heat exchangers, one or more compressors, a discharge system and piping connected to various equipment.

The gas phase fluidized bed reactors employed in the polymerization process of the present invention are not critical. A single reactor can be used or multiple reactors (two or more in series or staged) can be utilized. Another type of gas phase reactor which can be used is one or more stirred or mechanically fluidized tank reactors.

Conventionally, in a fluidized bed polymerization process, the monomer stream that passes through the bed but is not reacted moves upwardly in the reactor toward the expanded section (portion of the reactor that expands outwardly and upwardly resulting in a reduction of gas and particle velocity). As a result, most of the particles fall back into the bed. Unreacted monomer is taken off as a cycle gas and fed into the bottom of the reactor with gas feed.

The catalyst is fed separately into the reactor, and, generally, the rate of catalyst addition controls the polymerization rate as well as the amount of heat generated in the fluidized bed. Any catalyst typically employed in gas phase fluidized bed polymerization processes can be employed in the improved polymerization process of the present invention. Such catalysts generally include transition metal catalysts such as titanium, vanadium, chromium, cobalt, nickel, and zirconium and mixtures thereof. Cocatalysts and catalyst promoters are well known and disclosed, for example, in U.S. Pat. Nos. 4,405,495; 4,508,842; and 5,187,246.

Additionally, the polymerization process of the present invention can include other additives such as fluidization aids, antifoulants, electrostatic eliminating additives, and inert particles. Inert particles can include, for example, carbon black, silica, clay, alumina, calcium carbonate and talc.

Typically, the polymerization process is conducted at a pressure ranging from about 10 psi to about 1000 psi, preferably about 200 to 500 psi and a temperature ranging from about 10° C. to about 150° C., preferably about 40° C. to about 115° C. During the polymerization process the superficial gas velocity ranges from about 1 to 3 feet/second, and preferably is about 1.5 to 2.5 feet/second.

Tangential Flow of Gas and Gas-Solids

Figure 2:
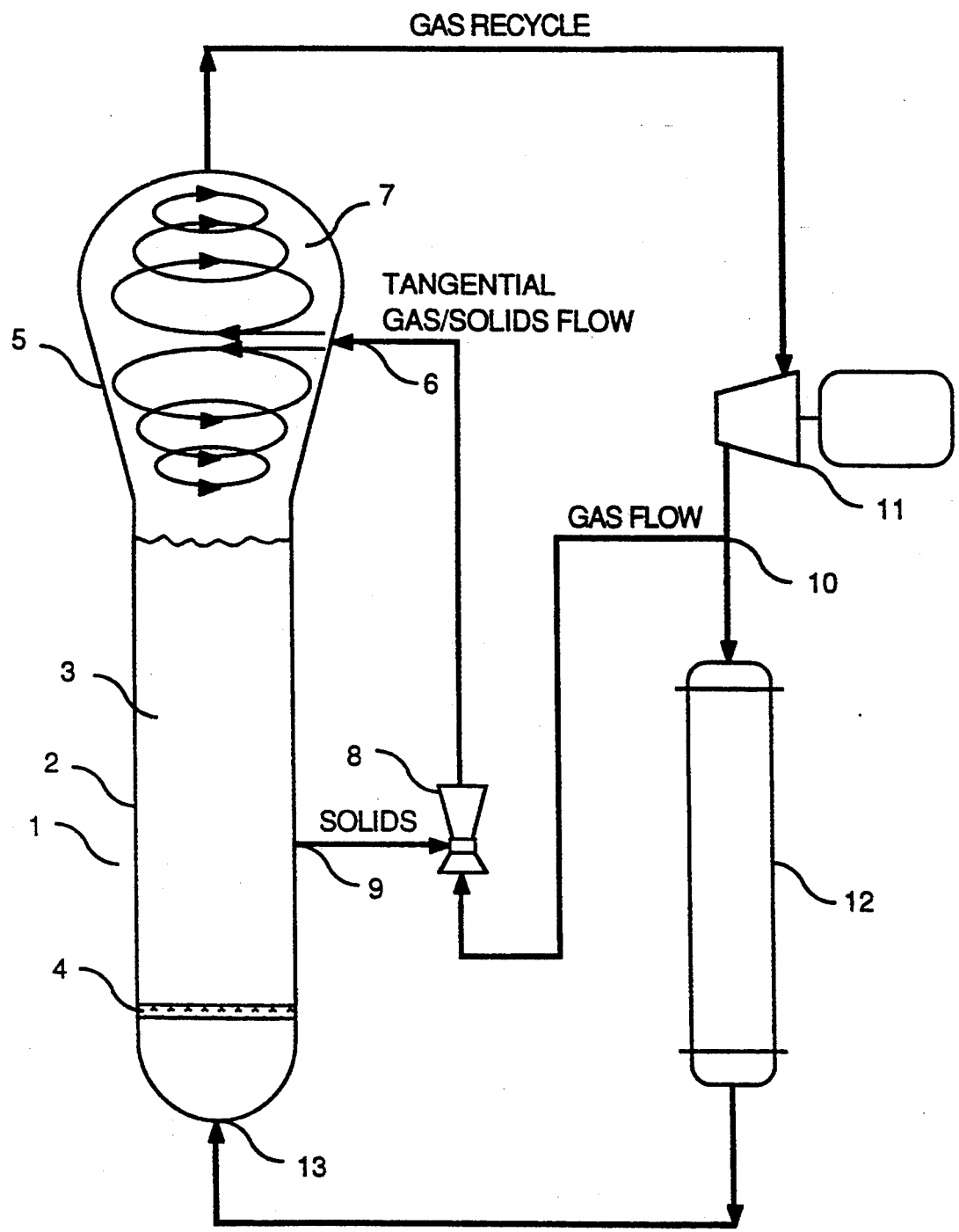
FIG. 2 is a schematic representation of a tangential gas-solids flow system.

Referring to FIGS. 1 and 2, in the present invention a gas or gas-solids tangential flow 7 is generated in the expanded section 5 of the gas phase fluidized bed reactor 1. The tangential gas or gas-solids flow is used to prevent solid particles from adhering to the interior of the expanded section and to remove solid particles from the inside walls of the expanded section of the reactor.

In general, the intensity and uniformity of the tangential gas or gas-solids is governed by the number or nozzles employed, the entering gas volume and velocity, and the diameter of the reactor. In FIG. 1, tangential gas flow 7 in the expanded section 5 of the reactor 1 is accomplished by generating a tangential gas flow using one or more, preferably 1 to 20, and most preferably 4 to 8, commercially available tangential nozzles 6. The nozzles should be capable of providing a gas velocity of from about 10 to 100 ft/sec, preferably from about 25 to 75 ft/sec for a conventional reactor. In the present invention, one or more nozzles 6 are positioned in the reactor vessel 1 at any elevation between the upper bed level of the resin 3 and the top of the reactor vessel 1. Preferably, the nozzles 6 are located about 20% to about 100% of the measured distance between the upper bed level and the level of greatest expanded section diameter. All the nozzles are mounted such that the circumferential direction of each discharge is in the same direction of rotation. The direction or path of the tangential gas flow is, hence, in the same rotational direction as the tangential nozzle or nozzles. The tangential nozzle direction typically ranges from about 45 degrees above horizontal to about 45 degrees below horizontal, preferably ranges from about 10 degrees above horizontal to 10 degrees below horizontal, and most preferably 0 degrees from horizontal.

Typically, in a commercial polymerization process in a gas phase fluidized bed reactor, all of the cycle gas is fed into the reactor through a distributor plate located at or near the bottom of the straight section of the reactor. In the present invention a first portion (primary flow) of the cycle fluidizing gas is supplied to the distributor plate 4 through inlet 13, and a second portion of the cycle gas (secondary flow) is supplied to the interior walls of the expanded section 5 of the reactor 1 via lines connecting to the tangential nozzles 6 in the expanded section 5 of the reactor 1. While the secondary flow line can be drawn from any point along the cycle line, preferably the secondary flow line runs from a point upstream of the heat exchanger 12, and most preferably runs from a point 10 between the heat exchanger 12 and the cycle gas compressor 11 to the expanded section 5.

The secondary gas flow is typically 2% to 60%, preferably 10% to 40%, by volume of the primary gas flow. While the size of the lines providing the primary and secondary flow to the reactor are dependent upon the diameter of the reactor, the lines providing the primary and secondary flows to the reactor should be able to maintain the velocity of the gas flow in a range from about 10 to 100 ft/sec, preferably 25 to 75 ft/sec.

By tangentially feeding the secondary flow into the expanded section of the fluidized bed, a gas vortex or swift flow is generated, thus, forming stable suspension layers of circulating particles in the expanded section. Particles projected upward from the fluid bed are preferentially carried outward toward the expanded section walls through centrifugal forces of the vortex, which reduces the quantity of fines entrained into the gas cycle system. This internal recirculating flow of gas and particles in the expanded section prevents particle adhesion to the interior and/or removes particles adhering to one or more interior surfaces of the expanded section. Particles removed from the interior surfaces fall by gravity into the resin bed or are swept into the primary gas flow where they are entrained and/or recirculated.

In another embodiment of the present invention depicted in FIG. 2, a tangential gas-solids flow 7 is generated in the expanded section 5 of the reactor 1. Polymer particles (solids) are fed by means of an outlet 9 or interconnecting line between the straight section 2 of the reactor via a solids feeding device such as a solids-eductor, rotary air lock feeder, or other solids feeding means 8 into the secondary gas flow line. Preferably, the solids feeding device is a solids-gas eductor. An eductor is a readily commercially available device in which the kinetic energy of one fluid (e.g., gas) is used to pump or transport another material (e.g., solid particles). The eductor consists essentially of a gas nozzle which discharges a high-velocity jet of gas or gas and solids across a suction chamber where a region of lower pressure is maintained according to the principle of Bernoulli. It is connected to the reactor to convey solids from the dense phase fluidized bed straight section of the reactor into the secondary gas flow line. The particles pass through the eductor into the secondary flow line and are tangentially injected along with the gas via the nozzle or nozzles 6 into the expanded section 5 of the reactor 1. The injected particles are larger and have greater inertial properties than the layered fines settled on the expanded section surfaces, and easily dislodge the lightly adhered fines as they cascade circumferentially and downward across the expanded section surfaces. The dislodged fines return by gravity to the fluid bed. Since the heavier particles are more effective in disrupting the fines layer adhesion on expanded section surfaces, solids injection substantially reduces the quantity of tangential gas flow necessary for cleaning expanded section surfaces.

In this embodiment, the secondary gas flow is typically 2% to 50%, and preferably 5% to 20% by volume of the primary gas flow. In this case the lines providing the secondary flows to the reactor must be sized for velocities sufficient for transport of the particulates, typically at velocities ranging from about 20 to 100 ft/sec and preferably 35 to 70 ft/sec. Also, the tangential nozzle direction typically ranges from about 90 degrees above horizontal to about 90 degrees below horizontal, preferably about 45 degrees above horizontal to about 45 degrees below horizontal, and most preferably from about 10 degrees above horizontal to about 10 degrees below horizontal. As the angle approaches the 90 degree limits, the primary removal is caused by the gravitational effect on the larger particles causing them to fall across the expanded section surfaces and back into the fluidized bed. Since these particles are typically much larger and have greater inertia than the particles adhering to the reactor surfaces, the fines layers are dislodged and fall back into the bed.

In the present invention the use of tangential gas or gas-solids flow improves the polymerization process by allowing the reactor to be operated for longer periods of time before shutdown for cleaning, provides a mechanism for adjusting the fluidized bed level, and, therefore, the polymer inventory in the reactor with minimal risk of fines accumulation on reactor surfaces and gas cycle lines, and provides a means for adjusting particle residence time and catalyst productivity with little or minimal risk of solid particle build-up in a reactor system and cycle system.

The following examples further illustrate the present invention.

EXAMPLES

Example 1

A cold model fluidized bed was used to create a tangential gas flow or tangential gas-solids flow. The cold model was composed of a fluidized bed (Plexiglas column 5.5 inches in diameter and 4 feet in height), a heater, and a nitrogen gas or air feed. A distributor plate fabricated from a stainless steel plate had 6 holes with semicircular caps covering the holes to prevent particles from falling through the holes when the unit was not operational. Up to 4 tangential nozzles mounted in the expanded section of the Plexiglas unit were evaluated. The nozzles were made from 3/4 inch outside diameter stainless steel tubing.

Plant nitrogen at a pressure of up to 150 psig was used to fluidize the bed of polyethylene polymer particles, with the superficial gas velocity adjusted to achieve fluidization. The tangential gas flow was adjusted manually to achieve a flow rate that was 25% to 33% of the primary gas flow, the flow being fed to the distributor plate. Experimental conditions were:
Superficial Gas Velocity: 1.5 to 2.0 ft/sec
Bed Weight: 3000 to 3800 grams
Bed Temperature Ambient It was discovered that the tangential gas flow directed to the expanded section created a tangential flow which inhibited or removed polymer particle build-up. Also, the amount of resin or carry-over being entrained into the gas flow exiting the top of the Plexiglas unit was reduced.

Example 2

In a cold model fluidized bed as described in Example 1, the following conditions existed:
Superficial Gas Velocity: 1.5 to 2.0 ft/sec (primary gas flow)
Bed Weight: 2500 grams (polyethylene)
Bed Temperature Ambient The average particle size of the 2500 grams of polyethylene particles initially charged was 615 micrometers. In addition, 500 grams of polypropylene resin particles having an average particle size less than 200 micrometers was added to the bed of polyethylene. A tangential gas flow was adjusted to a range of about 25 to 33% of the primary gas flow creating a tangential or swift flow. The fines entrainment through the upper gas outlet was 82 grams in 10 minutes with the tangential flow. When the tangential flow was discontinued, the entrainment increased to 162 grams in 10 minutes. Accordingly, the tangential flow decreased the amount of carry-over of entrained particles.

Example 3

In a cold model fluidized bed as described in Example 1, the following conditions existed:
Superficial Gas Velocity: 1.5 to 2.0 ft/sec
Bed Weight: 2500 grams
Bed Temperature: Ambient The polyethylene particles used for this example had a broad range of average particle sizes. A tangential gas flow was adjusted to a range of about 25 to 33% of the primary gas flow to create a tangential flow. The fines entrainment was 11 grams in 10 minutes with the tangential flow. When the tangential flow was discontinued, the entrainment increased to 100 grams in 10 minutes. Again, the tangential flow decreased the amount of carry-over or entrained particles.

Example 4

A fluidized bed made of stainless steel was used to further test the gas-solids tangential flow. The fluidized bed employed had a fluidized bed height of 6 feet and a bed diameter of 23.5 inches. The expanded section, 23.5 inches in diameter, was 2 feet tall. In addition, the fluidized bed of the system contained a distributor plate. Plant nitrogen or air was used as the gas to fluidize the bed of polyethylene polymer particles. A solids eductor was connected to the fluidized bed through a 1-inch diameter nozzle at a point about 1 foot above the distributor plate via a 1 inch diameter nozzle. The discharge of the eductor was piped to a 1-inch diameter tangential nozzle mounted in the expanded section of the unit.

Plant nitrogen at a pressure of up to 150 psig was used to fluidize the bed of polyethylene polymer particles, with the superficial gas velocity adjusted to achieve a fluidizing flow of about 1.5 to 2.0 ft/sec. The secondary gas flow being fed to the eductor was adjusted to achieve a solids concentration of up to that of the fluidized bulk density of around 12 lb/ft$^3$.

It was subsequently observed that the gas-solids from the tangential nozzle created a tangential flow that removed the accumulated fines and resin particles from the expanded section.

Examples 5, 6, and 7

At atmospheric conditions, a cold model system comprising a fluidized bed made of Plexiglas (3 feet diameter), a compressor which circulated air as the fluidizing medium, and a cycle pipe was used to visually determine the effectiveness of using a solids eductor to create a tangential flow in the expanded section of a reactor to remove particle build-up. The fluidized bed containing polyethylene resin was held at a fixed superficial gas velocity for a given period of time, typically 5 to 10 minutes, which resulted in a build-up of resin particles in the expanded section of the reactor cold model. Air was used to fluidize resin particles to an expanded bed height of about 4 feet. The superficial gas velocity was regulated manually from about 1.5 to 2.0 ft/sec. The solids eductor was connected to a nozzle at a distance of about 1 foot above the distributor plate. The gas used for the secondary flow was compressed air supplied by three 16 cubic foot cylinders connected in parallel. The cylinders were used to ensure sufficient volume was supplied during the testing.

One test, Example 5, discharged the gas-solids flow into a 4-inch diameter nozzle. This created a tangential flow motion which removed the polymer build-up on the expanded section. However, another test, Example 6, was conducted in which the gas-solids discharged into a 1-inch diameter nozzle. This created a more intense tangential flow as compared to the 4-inch diameter nozzle and easily removed the polymer particle build-up. Another test, Example 7, was conducted in which the eductor was removed from the line and only gas was discharged through the 1-inch nozzle. Since the pressure drop across the eductor was removed, the gas velocity increased. This increased the intensity of the tangential flow even further. In all cases, the polymer particles were removed but the intensity of the tangential flow increased from Example 5 (lowest) to 7 (highest). These three examples illustrate that the gas velocity through one or more tangential nozzle is effective in controlling polymer build-up.

Example 8

A pilot scale fluidized bed reactor operated similar to that described in U.S. Pat. No. 4,482,687 was used to determine the effectiveness of particle removal during polymerization. A solid eductor was connected to the reactor at a point about 1 foot above the distributor plate. A 1-inch diameter stainless steel line located downstream of the compressor and upstream of the heat exchanger was connected to serve as the high pressure motive gas for the eductor. The discharge of the eductor was connected through a Y-block to one of two tangential nozzles (1 inch diameter) located in the expanded section.

Ethylene, hydrogen, and 1-hexene were fed continuously to the reactor to maintain the following conditions:
Bed Temperature: 85° C.
Reactor Pressure: 300 psig
Ethylene Partial Pressure: 120 psia
1-Hexene to Ethylene Molar Ratio: 0.03
Hydrogen to Ethylene Molar Ratio: 0.017

The catalyst used was a titanium based Ziegler-Natta catalyst with a trialkyl aluminum co-catalyst. The polyethylene resin produced had a 0.45 melt index and 0.9285 gm/cc density.

The fluidized bed level is typically operated at about 5 feet, but was lowered to induce fouling in the expanded section of the reactor. The skin thermocouples, used to directly indicate polymer build-up on the inner reactor surfaces, registered wall surface temperatures about 5° C. to 11° C. below the controlled bed temperature, indicating that a layer of resin fines had settled and adhered to the reactor wall. The solid eductor was then opened by a manual valve and the secondary gas flow was adjusted to about 25% of the primary gas flow supplying gas to the distributor plate. The skin thermocouples below the point of discharge of the tangential nozzles quickly registered normally, nearly matching the bed temperature indicating that the particle build-up had been removed. The thermocouples mounted above the tangential nozzles showed similar removal of the fines layer but with slightly lower temperature readings. Although the wall temperatures are normally slightly lower at distances further from the bed, the thermocouple readings stabilized at temperatures close to the bed temperature indicating that at least partial removal of the fines layer had also occurred at this location.

Example 9

In a unit similar to that described in Example 8, except that gas only was used to create the tangential flow, the following experiment was performed. A chromium oxide catalyst was used instead of titanium based. The conditions in the reactor were maintained to produce a polyethylene product having a flow index of 13 to 15 and a density of 0.9480 gm/cc. The conditions were:
Bed Temperature: 95° C.
Reactor Pressure: 350 to 360 psig
Ethylene Partial Pressure: 120 psia
1-Hexene to Ethylene Molar Ratio: 0.005
Hydrogen to Ethylene Molar Ratio: 0.05

The gas tangential flow was adjusted to about 25% of the primary flow. Resin samples were subsequently taken from the expanded section of the reactor. The sample point was located about 4 feet above the upper tangential nozzle which was located on the transition section of the reactor. It was found that there was no build-up of low flow index, or high molecular weight, material on the wall indicating that the gas tangential flow prevented and/or removed polymer particle build-up from the wall. In this example, the low flow index material was made of polyethylene fines that form high molecular weight polymer under low temperature conditions in the expanded section. It was found that the amount of fines in the samples collected from the sampling point in the top of the reactor was approximately 100 times higher than when tangential flow was used.

Example 10

A gas phase fluidized bed polyolefin reaction system containing a fluidized bed volume of about 7000 cubic feet and containing about 130,000 pounds of polymer resin is used.

The reactor is operated at a production rate of about 35,000 pounds per hour or about 4 hours residence time. The reaction system produces a polyethylene product having a melt index of above 2 g/10 minutes and a density of about 0.924 g/cm$^3$ using a titanium based catalyst while operating at the following conditions:
Reactor pressure: 300 psig
Reactor temperature: 91° C.
Ethylene partial pressure: 110 psia
1-Hexene to ethylene molar ratio: 0.105
Hydrogen to ethylene molar ratio: 0.186

In order to transition to a different grade polymer product, having a melt index of about 5 g/10 minutes and a density of about 0.934 g/cm$^3$ a tangential flow is created in the expanded section. The tangential flow is created by taking a secondary flow from between the compressor and cycle gas heat exchanger in an amount of 25 to 33% of the primary flow being supplied to the distributor plate. The secondary flow is fed to the expanded section through 4 tangential nozzles sized to create a velocity of 50 ft/sec through the nozzles. Once it is evident that the fines are being removed from the expanded section as indicated by the expanded section skin thermocouples, the fluidized bed level is lowered slowly to about one-half the normal operating level while maintaining a constant production rate. During this period, tangential flow is continued. After the bed level reaches the reduced level, the conditions in the reactor are adjusted as follows to make the different grade polyethylene product having a melt index of about 5 g/10 minutes and a density of about 0.934 g/cm$^3$:

Reactor pressure: 300 psig
Reactor temperature: 96° C.
Ethylene partial pressure: 160 psia
1-Hexene to ethylene molar ratio: 0.069
Hydrogen to ethylene molar ratio: 0.290

Once these conditions are achieved in the reactor, and the product reaches specifications, the bed level is allowed to build to the normal operating level to complete the grade transition. The tangential flow makes it possible to do a grade transition in about 6 hours as compared to the 12 hours commonly practiced.

Example 11

Example 11 is substantially repeated, except that the catalyst system employed is chromium based and the fluidized bed level is operated at the normal full level. Also, a solids eductor is used to create the tangential flow instead of gas alone. The solids eductor is connected to the straight side of the reactor at a distance of one-half the distance from the distributor plate to the lower level of the transition section above the distributor plate and is connected to 6 tangential nozzles sized for a velocity of about 40 feet/second located in the expanded section. The reactor is operating at the following conditions:

Reactor pressure: 350 psig
Reactor temperature: 106° C.
Ethylene partial pressure: 192 psia
1-Hexene to ethylene molar ratio: 0.0016
Hydrogen to ethylene molar ratio: 0.17
Polymer flow index: 40 g/10 min
Polymer density: 0.955 g/cm$^3$ During operation, accumulation of particles on the reactor expanded section is indicated by the use of skin thermocouples. If these particles are allowed to remain on the internal reaction surfaces, they form high molecular weight particles which fall from the surfaces. These high molecular weight particles commonly contaminate the fluidized bed resin resulting in poor quality product. The solids eductor is then placed in service. As a consequence, the particles adhering to the surfaces of the expanded section are removed by the gas solids tangential flow preventing them from forming gels or poor quality product. The gas-solids tangential flow continues to operate so that particles do not again attach to the internal reactor surfaces.

Example 12

Example 11 is substantially repeated, except that the reaction system employed is a multiple (in this case, two) reactor system as described in any of U.S. Pat. Nos. 5,047,468; 5,125,398; and 5,149,738. For staged reactor polymer products, the final bi- or multi-modal polyolefin product properties are dependent upon the molecular weight distribution which is controlled, in part, by the production rate split. The production rate split is defined as the amount of high molecular weight component in the final bimodal resin. Since the first reactor of the multiple reactor system serves as the catalyst feed for the next, only limited split combinations are conventionally achievable (given a non-changeable fluidized bed reactor volume) because of catalyst decay and limits on ethylene partial pressure.

The reactors, referred to in this example as Rx1 for the first reactor in the sequence and Rx2 for the second reactor in the sequence are used. Rx1 produces a high molecular weight polyethylene resin having a flow index of about 0.45 g/10 minutes and a density of about 0.930 g/cm$^3$, Rx2 produces a low molecular weight polyethylene resin component having a melt index of about 1000 g/10 minutes and a density of about 0.968 g/cm$^3$. The conditions for the reactors are as follows:

|  | Rx1 | Rx2 |
|---|---|---|
| Reactor pressure: | 300 psig | 300 psig |
| Reactor temperature: | 85° C. | 110° C. |
| Ethylene partial pressure: | 40 psia | 90 psia |
| 1-Hexene to ethylene molar ratio: | 0.033 | 0.010 |
| Hydrogen to ethylene molar ratio: | 0.034 | 1.700 |

The production rate for the first reactor is about 39.000 lb/hr and the second reactor total production rate is about 65,000 lb/hr resulting in a split of about 0.6 with a final bi-modal resin product having a flow index of about 8 g/10 minutes and a density of about 0.948 g/cm$^3$. It is desired to change the split to 0.3 while maintaining the same overall production rate to produce a different bi-modal product having an overall flow index of about 144 g/10 minutes and density of about 0.958 g/cm$^3$. This change is accomplished by putting into service a gas-solids eductor to create a gas-solids tangential flow. The fluidized bed level in Rx1 is lowered to a height approximately one-half the normal operating height. The ethylene partial pressures in both reactors are adjusted to achieve the final split of 0.3. From this example, it can be seen that without lowering the fluidized bed level, the split could not have been achieved because the residence time in Rx1 would have lowered the catalyst activity of the resin entering Rx2 . Thus, the required production rate from Rx2 could not have been achieved. Likewise, lowering the ethylene partial pressure in the first reactor and increasing catalyst feed rate is not possible because the ethylene partial pressure drops to an uncontrollable low pressure.

Example 13

A reactor as described in U.S. Pat. No. 5,264,506 is started at 50° C. using a vanadium catalyst to produce EPDM (ethylene-propylenediene) granular resin. The following conditions are maintained throughout the run:

Reactor pressure: 300 psig
Reactor temperature: 50° C.
Ethylene partial pressure: 90 psia
1-Propylene to ethylene molar ratio: 0.8
Hydrogen to ethylene molar ratio: 0.001
Ethylidene-norbornene concentration: 60–80 ppm Carbon black is added intermittently to the reactor to keep the static activity level under control and to prevent the sticky polymer from agglomerating. This amount ranges between 15 and 20 wt. % based upon the total polymer product weight.

During normal operation the amount of carbon in the reaction system was allowed to double to off-set an increase in polymer build-up on the reactor expanded section. A gas tangential flow was created by discharging gas through a nozzle mounted tangentially in the expanded section of the reactor. The tangential flow cleaned the EPDM material adhering to the reactor surfaces thus allowing the carbon level in the resin to be reduced to about 30% of the higher value. The reactor continued to operate at this reduced carbon level.

What is claimed is:

1. An improved method for polymerizing one or more polyolefins in the presence of a transition metal catalyst in at least one gas phase reactor having a straight section and an expanded section, the improvement comprises generating a flow of gas or gas-solids tangentially to one or more interior surfaces in the expanded section of the reactor to reduce particle build-up.

2. The method of claim 1 wherein a tangential gas or gas-solids flow is accomplished by means of one or more tangential nozzles capable of providing a gas velocity of about 10 to 100 feet/second.

3. The method according to claim 2 wherein the tangential flow is accomplished by 1 to 20 tangential nozzles.

4. The method of claim 3 wherein the nozzles are positioned in the gas phase reactor at an elevation between an upper bed level of polymer and the top of the reactor.

5. The method of claim 4 wherein a primary flow of a cycle gas is supplied to a distributor plate and a secondary flow of cycle gas is supplied to the reactor above the top of the bed level.

6. The method of claim 5 wherein the secondary flow of cycle fluidizing gas is 2% to 60% by volume of the primary flow of the cycle gas.

7. The method of claim 6 wherein the tangential flow of gas-solids is accomplished by feeding solid polymer particles from the straight section of the reactor by means of a solids feeding device into the secondary flow of cycle gas.

8. The method of claim 7 wherein the nozzles have a tangential nozzle direction ranging from about 90 degrees below horizontal to about 90 degrees above horizontal.

9. The method of claim 1 wherein the polyolefin is a linear homopolymer of ethylene or a linear copolymer comprised of a major mole percent of ethylene or propylene and a minor mole percent of one or more $C_3$ to $C_8$ alpha olefins.

10. The method of claim 1 wherein the polyolefin is selected from the group consisting of
    (i) ethylene/propylene rubbers;
    (ii) ethylene/propylene/diene rubbers;
    (iii) polybutadiene rubbers;
    (iv) high ethylene content propylene/ethylene block copolymers;
    (v) ethylene/propylene/hexadiene terpolymers;
    (vi) ethylene/propylene/ethylidene norbornene; and
    (vii) poly(1-butene).

11. The method of claim 1 wherein the polyolefin is produced in a staged reaction process comprising two or more reactors.

* * * * *